United States Patent [19]

De Graaf

[11] Patent Number: 4,624,869

[45] Date of Patent: Nov. 25, 1986

[54] ALKYD RESIN CURE MODIFIERS

[75] Inventor: Henry J. De Graaf, Stow, Ohio

[73] Assignee: SCM Corporation, New York, N.Y.

[21] Appl. No.: 716,698

[22] Filed: Mar. 27, 1985

[51] Int. Cl.$^4$ .............................................. C08L 67/08
[52] U.S. Cl. .............................. 427/385.5; 427/388.2; 525/7; 525/7.4; 525/127; 525/167.5
[58] Field of Search .................... 525/7, 7.4, 127, 440, 525/920, 167.5, 176; 427/385.5, 388.2

[56] References Cited

U.S. PATENT DOCUMENTS 3,448,172 6/1969 Damusis ............................ 525/920
4,421,894 12/1983 O'Connor ............................ 525/28

FOREIGN PATENT DOCUMENTS 58-021459 2/1983 Japan .................................... 525/7.4

Primary Examiner—John C. Bleutge
Assistant Examiner—Patricia Short
Attorney, Agent, or Firm—Thomas M. Schmitz

[57] ABSTRACT

In high solids alkyd resin coatings the blend of 10 to 50 weight percent of unsaturated polyester or unsaturated polyester urethane cure modifiers improves the cure, hardness, gloss and film properties of alkyd and acrylic resins adapted to cure by oxidative methods.

4 Claims, No Drawings

ALKYD RESIN CURE MODIFIERS

BACKGROUND OF THE INVENTION

Recent efforts of the coatings industry directed at the problem of volatile organic emissions of organic coatings have promoted the use of vinyl or acrylate monomers as reactive diluents. Reactive diluents are described by Emmons, *Chemistry of High Solids Alkyd/-Reactive Diluent Coatings*, Jr. Coatings Technology 55, No. 702, July 1983, and in U.S. Pat. Nos. 4,014,830; 4,097,677; 4,145,503; 4,178,425; and 4,224,202. While the reactive diluent technology provides reduced solvent emission and high solids coatings, such systems have the disadvantage of slow dry and film cure on application.

U.S. Pat. No. 4,304,883 (1981 to Hitachi) claims an unsaturated polyester resin composition prepared from dicyclopentadiene modified unsaturated alkyds (polyesters) containing allyl ethers and dissolved in a polymerizable vinyl monomer (styrene) and cured in the presence of air with organic peroxides. Polyesters prepared from unsaturated dicarboxylic acids are well known. Strazik et al in U.S. Pat. Nos. 4,280,938; 4,281,091; and 4,293,461 describe unsaturated condensates of an alkoxymethylmelamine, allylic alcohol and acrylamide useful for modifying alkyds for high solids air-drying compositions.

The present invention relates to improved air-drying alkyd, polyester or acrylic resins containing unsaturated polyester resins or urethane modified unsaturated polyester resins which function as cure modifiers and coatings prepared therefrom.

SUMMARY OF THE INVENTION

The invention relates to improved coating composition and articles coated therewith comprising a drying oil alkyd, an unsaturated fatty acid modified polyester or acrylic coating having blended therewith 5 to 50 weight percent of a polyester cure modifier selected from the group consisting of an unsaturated polyester or unsaturated polyester urethane having a number average molecular weight from about 400 to 1600 and containing from about 1 to about 5 ethylenically unsaturated oxidative cure sites per molecule.

Another aspect relates to an unsaturated drying oil alkyd having blended therewith 5-50 weight percent basis total binder of a polyester urethane modifier comprising the reaction product of 1,6-hexanediol, neopentyl glycol, trimethylol ethane or trimethylol propane, an unsaturated dicarboxylic acid or anhydride, isophthalic acid, lauric acid, benzoic acid and isophorone diisocyanate provided that the urethane modifier contains at least two ethylenically unsaturated cure sites and at least one urethane linkage per molecule.

DETAILED DESCRIPTION OF THE INVENTION

This invention relates to improved alkyd type coatings, and to a cure modifier for such oxidatively cross-linkage alkyd, polyester or acrylic polymers. Specifically the invention relates to drying oil, or drying oil fatty acid modified alkyd, polyester and acrylic polymers that are modified by blending in a lessor amount of an unsaturated polyester polymer comprising the esters of unsaturated dicarboxylic acids or anhydrides.

The polyester or urethane polyester modifiers of the instant invention comprises the reaction product (ester) of one or more unsaturated dicarboxylic acids (or anhydrides), with glycols, polyols or hydroxyl functional oligomers selected from the group consisting of polyester diols, urethane diols, polyether diols, polyepoxide polyols, vinyl copolymer polyols and mixtures of the above. Said polyester modifier has a number average molecular weight ranging from about 400 to about 1600 and contains about one to five unsaturated groups per molecule and preferably at least two such groups. The modifier, blended at from about 10 to 50 weight percent basis total binder, can be prepared in a fashion similar to polyesters used in reinforced plastics and in gel-coat applications except that the use of vinyl monomers as the dilution solvent is unnecessary and often undesirable. The modifier polyester is formulated specifically for compatibility with the primary film forming alkyd (polyester) or acrylic polymer.

In order to achieve compatibility and stability of the blend of primary film former and modifier up to 25% by weight and preferably 5 to 15% of other components can be used in the synthesis (preparation of the polyester or urethane polyester polymer). These include, for example, saturated fatty acid, e.g. stearic acid, lauric acid and the like and/or aromatic acids, e.g. benzoic acid, and 4-tert-butylbenzoic acid.

Useful unsaturated dicarboxylic acids (or their anhydrides) include maleic acid, fumaric acid, itaconic acid, citraconic acid and the like. For preparing unsaturated ester modifiers maleic and fumaric acid are preferred. The unsaturated dicarboxylic acids can be combined with other dicarboxylic acids in formulating an unsaturated modifier. Such acids include phthalic, isophthalic, adipic, azelaic acids and other saturated or aromatic acids or anhydrides. A mixture of maleic anhydride with isophthalic acid is a preferred combination for the ester modifier components.

Examples of useful diols and polyols include ethylene glycol, propylene glycol, diethylene glycol, dipropylene glycol, neopentyl glycol, 1,3-butylene glycol, 1,6-hexanediol, trimethyl pentanediol, cyclohexanedimethanol, glycerin, trimethylolethane, trimethylolpropane and pentaerythritol. Other useful polyols include, for example, vinyl-allyl alcohol copolymers, epoxy resins, polyether polyols or urethane polyols.

Diisocyanates useful in the practice of this invention include alkyl diisocyanates and aryl diisocyanates such as, for example, isophorone diisocyanate, toluene diisocyanate, and tetramethyl xylene diisocyanate with isophorone being especially preferred. The isophorone diisocyanate provides urethane linkages in the unsaturated modifiers and these contribute to the good film properties, glass transition temperature ($T_g$) and weatherability.

The unsaturated polyester or urethane polyester modifiers are combined by blending with the primary film forming resin, i.e. alkyd or acrylic resin containing unsaturated fatty acids, in amounts ranging from about 5 to about 50 and preferably 10 to 30 weight percent basis primary film former. Other additives, resins, reactive monomers, diluents, pigments, fillers, etc., known to the art can be used to develop desirable film forming and coating properties. Paints formulated from the blend of the instant invention may be applied to metal or wood substrate by usual techniques including brush coating, spray coating, flow coating, roll coating, electrostatic coating, and the like. Such paints are particularly useful in coating off-road vehicles such as farm implements or construction equipment.

The applied coatings readily cure in air at temperatures ranging from ambient to above 160° C. Metal driers, in the form of polyvalent metal salts or complexes of organic acids, and known in the coatings trade, are useful to accelerate the oxidative cure of the unsaturated drying oil modified alkyd, polyester or acrylic polymer. Cobalt or manganese naphthenates or octoates are primary examples of driers serving this function. Other auxiliary driers are also used in combination with cobalt or manganese to promote faster hardness development and early water resistance. Examples are the metal salts of calcium, zirconium, potassium, iron, zinc, copper or lead. Drier accelerators such as 1,10 phenanthroline are often used along with the metal driers to improve dry performance. Other useful additives for the instant coatings include volatile stabilizers such as methylethyl ketoxime and are useful and necessary to prevent polymerization or skinning of paints or resin mixtures in containers or storage tanks prior to application.

The following exemplary examples which illustrate the invention should not be read in a restrictive manner. Unless otherwise indicated, temperatures are given in degrees Centigrade and percentages are expressed as weight percentages.

EXAMPLE 1

Preparation of Cure Modifiers

A cure modifier was prepared from the following components:

|   |   |   | Moles | Grams |
|---|---|---|---|---|
| A | 1,6-Hexanediol | | 2.08 | 246 |
|   | Neopentyl Glycol | | 8.73 | 910 |
|   | Isophthalic Acid | | 4.51 | 750 |
| B | Trimethylol Ethane | | 1.87 | 232 |
|   | Maleic Anhydride | | 6.59 | 646 |
| C | Lauric Acid | | 2.22 | 444 |
|   | Benzoic Acid | | 1.41 | 172 |
| E | Isophorone Diisocyanate | | 0.225 | 50 |
|   | Esterification Water | | — | −315 |
|   | Additions: | | | |
| (B) | Piperidene | isomerization catalyst for maleic anhydride | | 3.0 |
| (D) | Toluene | azeotrope solvent for water removal | | 60.0 |
| (E) | Dibutyl Tin Dilaurate | catalyst for isocyanate reaction | | (5 drops) |
| (F) | Hydroquinone | polymerization inhibitor | | 0.30 |
|   | Xylene | reducing solvent | | 825 |

To a 5-liter reaction flask equipped with fractionation column, condenser, nitrogen sparge, thermometer, agitator and heating mantle were charged—glycol component (A) and heat was applied to 100° C. Insophthalic acid was added and the mix heated to reflux. Reflux was continued at a head temperature of 95°-100° C. until the batch cleared (batch temperature 205°-232° C.). After cooling to below reflux, the trimethylol ethane (B) and the remainder of glycol (A) was added.

Add maleic anhydride when temperature is below 140° C.; follow with piperidine. Hold 125°-130° C. (cool if necessary) until exotherm is over (10-15 minutes). Add (C): gain reflux (head temperature 95°-100° C.) and hold (max. batch temperature 232° C.) removing water thru column until head temperature drops below 95° C. Remove column and attach Dean-Stark water trap using toluene or xylene azetrope. Continue process and hold for acid number 25 or less, adding (D) to batch as required. Cool to 132° C. or less and add (E), hold 1-2 hours at 120°-125° C., cool (add xylene to assist) to 85° C. blending in reducing solvent and inhibitor (F) to give a non-volatile content to 75.5%; viscosity Z 2½ (Gardener-Holt bubble tube) and acid number 17.6 (sol'n).

EXAMPLES 2-7

The process of Example 1 was repeated substituting in whole or in part different glycols such as hydrogenated bisphenol A and different diacids such as azelaic acid for those of Example 1. The various formulations are shown in Table I.

TABLE I

| | EXAMPLE NUMBERS | | | | | |
|---|---|---|---|---|---|---|
| | 2 | 3 | 4 | 5 | 6 | 7* |
| 1,6-Hexanediol | — | 246 | 246 | 202 | 202 | 142 |
| Neopentyl glycol | 1077 | 875 | 926 | 712 | 580 | 480 |
| HBPA (hydrogenated bisphenol A) | 424 | — | — | 366 | 366 | 240 |
| Isophthalic acid | — | 742 | 736 | 626 | 650 | 480 |
| Azelaic acid | 373 | — | — | — | — | — |
| Maleic anhydride | 827 | 645 | 645 | 654 | 650 | 428 |
| Trimethylol ethane | — | 279 | 232 | 250 | 366 | 212 |
| Lauric acid | 247 | 246 | 443 | 450 | 450 | 284 |
| Benzoic acid | — | 369 | 172 | 140 | 140 | — |
| Isophorone diisocyanate | 303 | 46 | 50 | 50 | — | — |
| Dilution solvent, | styrene | xylene | xylene | xylene | xylene | xylene |
| amount | 857 | 925 | 820 | 826 | 850 | 700 |
| Esterification water | −208 | −312 | −327 | −310 | −304 | −212 |

*Additionally contains 180 parts silicone (Dow Corning Z-6018) resin modifier

EXAMPLE 8

The modifiers of Examples 1, 2, 4, and 5 were blended into an air-drying medium oil alkyd and using the following blend formulas:

| | Weight Ratio | |
|---|---|---|
| | N.V. | Solution |
| Alkyd* | 13.3 | 19.0 |
| Cure Modifier | 4.7 | 6.2 |
| Solvent** | — | 4.8 |
| Drier Mix*** | — | 0.35 |

*A medium oil alkyd based on sunflower oil and refined tall oil fatty acids - 70% N.V. (wt) in xylene.
**Xylene or as specified
***Drier and stabilizer mix: 2.50 grams Cobalt Cem-All (12%) 5.00 grams Zirconium Cem-All (12%); 4.00 grams Potassium Hex-Cem (15%) and 1.60 grams methyl ethyl ketoxime anti-skin stabilizer.

EXAMPLE 9

The modifiers of Examples 1, 2, 4, and 5 blended as in Example 8 were compatible with the alkyd and were tested as clears on the B.K. Drying Recorder instrument, which monitors the drying process of a thin film cast on glass plates with weighted needles drawn across the coating over a 24-hour or 48-hour period. Using a wet film thickness of 0.0015 inch, a needle weight of 16.0 grams at ambient temperature of 78° F. and 46% humidity the results shown in Table II showed a marked improvement in cure (4–8 hours) when the alkyd contained the cure modifier additive. Compositions of Examples 1, 4, and 5 gave improved hardness development at 8–24 hours over the control.

EXAMPLE 10

The modifiers of Examples 5, 6, and 7 were blended with the medium oil alkyd used in Example 8 according to the following formulation and were identified as 5A, 6A, and 7A:

| Example Number | | Pre-Blend | Alkyd Mixes | | |
|---|---|---|---|---|---|
| | | | 5A | 6A | 7A |
| Alkyd$^{(a)}$ | (70% N.V.) | | 19.3 | 19.3 | 15.4 |
| Cure Modifier | | | | | |
| Polyester$^{(b)}$ | (70% N.V.) | | 6.4 | 6.4 | — |
| Polyester$^{(c)}$ | (75% N.V.) | 80 | — | — | 10.3 |
| Amino Resin$^{(d)}$ | (78% N.V.) | 33 | | | |
| Xylene | | 9.4 | 4.3 | 4.3 | 4.3 |
| Drier Mix$^{(e)}$ | A | | 0.32 | 0.32 | 0.32 |
| | B | | 0.20 | 0.20 | 0.25 |

$^{(a)}$Medium oil alkyd of Example 8.
$^{(b)}$Polyester of Example 5 or 6.
$^{(c)}$Polyester of Example 7.
$^{(d)}$An unsaturated melamine condensate — Monsanto AM-325.
$^{(e)}$Drier Mix: (A) 2.24 grams Cobalt 18; 2.12 grams Activ-8 (R. T. Vanderbilt Company); 5.64 grams MIBK solvent.
(B) 1.22 grams Cobalt-Zirconium 69; 2.0 grams MEK-oxime; 3.6 grams Calcium Octoate (5%); 3.2 grams MIBK solvent.

The above blend using Example 7 polyester had a ratio of 60% alkyd; 28% polyester, and 12% amino resin based on non-volatile.

The above formulations were tested as clears and drying characteristics were evaluated as shown in the latter half of Table II. All of the samples showed superior dry to the control. The blend of Example 7A gave the best through dry and hard dry coatings. Those of 5A and 6A were considerably superior to the control with no cure modifier.

TABLE II

| | CONDITION OF FILM, HOURS OF DRY | | | |
|---|---|---|---|---|
| Example No. | Top Dry (skin forms) | Thru Dry** (cut narrows) | Hard Dry (last cut) | (on top) |
| 1 | 1.0 | 4.0 | 17.0 | 17.0 |
| 2 | 1.5 | 4.5 | 30 | 35 |
| 4 | 1.0 | 4.5 | 20.5 | 22.5 |
| 5 | 0.8 | 5.5 | 20.0 | 24.5 |
| Control* | 1.1 | 9.0 | 29.0 | 33.5 |
| 5A | 1.5 | 6.5 | 16.0 | 25.2 |
| 6A | 1.5 | 7.0 | 19.5 | 24.2 |
| 7A | 1.5 | 4.5 | 9.6 | 14.5 |
| Control* | 1.8 | 11.0 | 27.2 | >44 |

*Medium Oil Alkyd Resin of Example 8 with no cure modifier.
**The Thru Dry stages (2–7 hrs.) of dry is shortened by 35–60% in the modified Examples as shown in Table II. This is particularly important for early water resistance for air dry coatings.

What is claimed is:

1. An air-drying coating composition comprising a drying oil alkyd having blended therewith 5 to 50 weight percent of a polyester urethane cure modifier; said urethane modifier comprising the reaction product of one or more polyols with an alpha,beta-unsaturated dicarboxylic acid further reacted with a diisocyanate to produce said modifier having a number average molecular weight from about 400 to 1600 and containing from about 1 to 5 ethylenically unsaturated oxidative cure sites and at least one urethane linkage per molecule.

2. The coating composition of claim 1 wherein the cure modifier comprises a polyester urethane being the reaction product of 1,6-hexanediol, neopentyl glycol, trimethylol ethane, isophthalic acid, lauric acid, benzoic acid; at least one unsaturated dicarboxylic acid selected from maleic acid and fumaric acid; and isophorone diisocyanate.

3. A substrate coated with the composition of claim 1.

4. A process for coating off-road vehicles by applying the coating of claim 1 and curing said coated vehicle.

* * * * *